US011531621B2

(12) United States Patent
Lea

(10) Patent No.: US 11,531,621 B2
(45) Date of Patent: Dec. 20, 2022

(54) SELECTIVE ENDPOINT ISOLATION FOR SELF-HEALING IN A CACHE AND MEMORY COHERENT SYSTEM

(71) Applicant: Microsoft Technology Licensing, LLC, Redmond, WA (US)

(72) Inventor: Perry Victor Lea, Eagle, ID (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/777,502

(22) Filed: Jan. 30, 2020

(65) Prior Publication Data
US 2021/0240622 A1    Aug. 5, 2021

(51) Int. Cl.
| | |
|---|---|
| *G06F 12/084* | (2016.01) |
| *G06F 9/455* | (2018.01) |
| *G06F 12/0804* | (2016.01) |
| *G06F 13/16* | (2006.01) |
| *G06F 13/42* | (2006.01) |
| *G06F 15/78* | (2006.01) |

(52) U.S. Cl.
CPC ........ *G06F 12/084* (2013.01); *G06F 9/45558* (2013.01); *G06F 12/0804* (2013.01); *G06F 13/1668* (2013.01); *G06F 13/4221* (2013.01); *G06F 15/7807* (2013.01); *G06F 2009/45583* (2013.01); *G06F 2213/0026* (2013.01)

(58) Field of Classification Search
CPC ............. G06F 9/45558; G06F 12/0804; G06F 12/084; G06F 13/1668; G06F 13/4221; G06F 15/7807; G06F 2009/45583; G06F 2213/0026
See application file for complete search history.

(56) References Cited

U.S. PATENT DOCUMENTS

| | | |
|---|---|---|
| 9,064,216 B2 | 6/2015 | Reddy et al. |
| 9,136,021 B2 | 9/2015 | Yang et al. |
| 9,436,623 B2 | 9/2016 | Wertheimer et al. |
| 9,674,116 B2 | 6/2017 | Dress |

(Continued)

OTHER PUBLICATIONS

D. Teodosiu, J. Baxter, K. Govil, J. Chapin, M. Rosenblum and M. Horowitz, "Hardware Fault Containment In Scalable Shared-memory Multiprocessors," Conference Proceedings. The 24th Annual International Symposium on Computer Architecture, 1997, pp. 73-84, doi: 10.1145/384286.264141. (Year: 1997).*

(Continued)

*Primary Examiner* — Eric T Oberly
(74) *Attorney, Agent, or Firm* — Holzer Patel Drennan

(57) ABSTRACT

A cache and memory coherent system includes multiple processing chips each hosting a different subset of a shared memory space and one or more routing tables defining access routes between logical addresses of the shared memory space and endpoints that each correspond to a select one of the multiple processing chips. The system further includes a coherent mesh fabric that physically couples together each pair of the multiple processing chips, the coherent mesh fabric being configured to execute routing logic for updating the one or more routing tables responsive to identification of a first processing chip of the multiple processing chips hosting a defective hardware component, the update to the routing tables being effective to remove all access routes having endpoints corresponding to the first processing chip.

22 Claims, 7 Drawing Sheets

(56) References Cited

U.S. PATENT DOCUMENTS

| | | | |
|---|---|---|---|
| 9,824,042 B2* | 11/2017 | Davis | G06F 13/4221 |
| 9,972,611 B2 | 5/2018 | Pappu et al. | |
| 10,180,889 B2 | 1/2019 | Cannata et al. | |
| 10,249,590 B2 | 4/2019 | Mandal et al. | |
| 10,282,669 B1* | 5/2019 | Chen | G06N 5/02 |
| 10,332,829 B2 | 6/2019 | Hong | |
| 2002/0129029 A1 | 9/2002 | Warner et al. | |
| 2012/0120959 A1* | 5/2012 | Krause | H04L 49/25 |
| | | | 370/392 |
| 2014/0082237 A1* | 3/2014 | Wertheimer | G06F 13/4022 |
| | | | 710/104 |
| 2016/0070646 A1* | 3/2016 | Smentek | G06F 12/0833 |
| | | | 711/135 |
| 2016/0164753 A1* | 6/2016 | Cimprich | H04L 47/27 |
| | | | 709/222 |
| 2016/0283303 A1 | 9/2016 | Sharma et al. | |
| 2018/0096971 A1* | 4/2018 | Pappu | G11C 29/48 |
| 2018/0101502 A1* | 4/2018 | Nassif | G06F 9/3869 |
| 2018/0267842 A1* | 9/2018 | Gou | G06F 11/1407 |
| 2018/0309565 A1* | 10/2018 | Paterson | H04L 43/0858 |
| 2019/0042481 A1* | 2/2019 | Feghali | G06F 12/1466 |

OTHER PUBLICATIONS

"International Search Report & Written Opinion issued in PCT Application No. PCT/US20/064742", dated Apr. 31, 2021, 11 Pages.

* cited by examiner

SELECTIVE ENDPOINT ISOLATION FOR SELF-HEALING IN A CACHE AND MEMORY COHERENT SYSTEM

BACKGROUND

As the demand for cloud-based storage and computing services increases rapidly, so too does the demand for technology that may rapidly scale hardware at existing data centers. Traditionally, hardware scaling is achieved by added resources to "scale up," such as by adding more power or capacity to a data center. More recent solutions, however, target ways to "scale out" or "scale horizontally" to support higher levels of performance, throughput, and redundancy for advanced fault tolerance without increasing cost and/or the total amount of hardware (e.g., without increasing a number of servers, drives, etc.). Architectures that enable this horizontal scaling are sometimes referred to as "hyperscale."

SUMMARY

According to one implementation, a cache and memory coherent system includes multiple processing chips each hosting a different subset of a shared memory space. One or more routing tables define access routes between logical addresses of the shared memory space and endpoints that each correspond to a select one of the multiple processing chips. A coherent mesh fabric physically couples together each of the multiple processing chips and is configured to execute routing logic for updating the routing table(s) responsive to the identification of a defective hardware component hosted by a first processing chip in the system. The update to the routing tables is effective to remove from the routing table(s) all access routes having endpoints corresponding to the first processing chip hosting the defective hardware component.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Hyperscale architectures that allow for memory, cache, and/or I/O coherence between processors are gaining popularity as a way to increase the number of users that can be supported by existing hardware and, as a secondary effect, de-duplicate storage (and thereby reduce data cost). A multi-processor system is said to be "coherent" or to have a coherent CPU architecture when its multiple CPUs share a single memory space such that at any CPU can read and write data to any memory location. A coherent CPU architecture relies on both cache and memory coherence (e.g., each processor of the system knows where the most recent version of the data is, even if that data is within a local cache hosted by another processor).

In coherent CPU architectures, problems can arise and are, in fact, amplified when shared hardware components fail. If, for example, multiple processors are configured to read and write data from a same memory component, a full-system hang-up may result when the memory component fails. Likewise, failure on a single processing component or shared bus can have a similar effect, ultimately disrupting more users and/or hanging more system processes than would otherwise occur in traditional (non-coherent) CPU architectures.

Although some coherent systems include modules that enable self-monitoring of hardware health for more rapid detection of potential hardware failure issues, these systems do little more than generate notifications regarding recommended replacement and repairs. In the time between the hardware failure and the component servicing and/or replacement, the entire CPU-coherent system (e.g., server with multiple system-on-chips (SoCs), each supporting different processes and/or users) may be rendered non-functional.

The herein disclosed technology allows these coherent CPU systems to at least partially "self-heal" by logically isolating a portion of the system including defective (e.g., malfunctioning, failed, or failing) hardware component(s) responsive to detecting and identifying a relative location of the defective component(s). In one implementation, this isolation of the defective hardware allows a healthy remaining subset of CPUs in the memory and cache coherent system to continue to function nominally, such as by continuing to service user requests and to execute processes, provided that those requests and processes do not require access to resources within the isolated portion of the system. In many cases, this isolation allows the system to perform at a high percentage of its nominal "healthy" level, such as by continuing to support a significant subset (e.g., 50%, 75%, or more) of the users connected to the coherent CPU system (e.g., a server) and/or by continuing to nominally operate a large portion (e.g., 50%, 75% or more) of the total processing and storage resources.

Figure 1A:
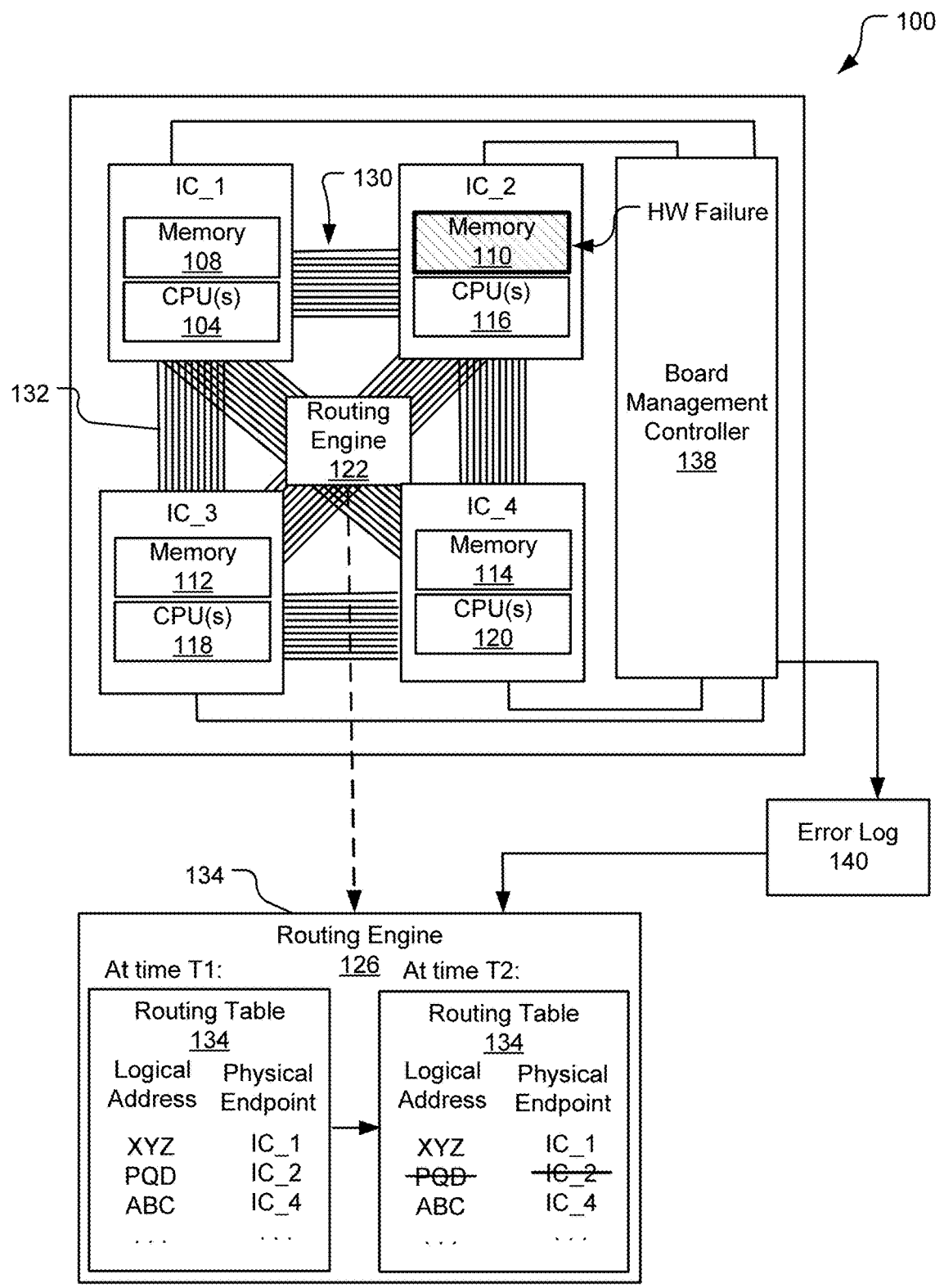
FIG. 1A illustrates an example coherent CPU system that implements self-healing logic to selectively isolate a region of the system following the detection of a defective hardware component.

FIG. 1A illustrates an example CPU coherent system 100 that implements self-healing logic to selectively isolate a region of the system following the detection of a defective hardware component. The CPU coherent system 100 includes multiple processing chips coupled together by a coherent mesh fabric 130. The coherent mesh fabric 130 may, in general, be understood as encompassing physical interconnects and logical architecture that allows each of the processing chips to collectively operate as a memory-coherent and cache-coherent system such that all processing entities in the system can read and write data to any memory location and have knowledge of the location of the most recent version of any data stored in the system, even if that data resides in a local cache hosted by a different processing chip.

The example CPU coherent system 100 includes four processing chips, annotated IC_1, IC_2, IC_3, and IC_4. Each of these different processing chips hosts memory (e.g., memory 108, 110, 112, and 114) and includes at least one CPU (e.g., CPUs 104, 116, 118, and 120). In one implementation, each of the processing chips (IC_1, IC_2, IC_3, and IC_4) is a system-on-chip (SoC) that includes multiple processors including for example, one or more CPUs and one or more graphics processing units (GPUs). As used herein, a processing chip is said to "host" memory when it physically includes that memory or is directly coupled to the memory such that data in route to the memory does not flow across any other processing chip between the processing chip hosting that memory and the memory itself.

In FIG. 1A, the four different processing chips are, in one implementation, coupled to a same printed circuit board assembly (PCBA), such as to collectively operate as part of a same server (e.g., a blade server, sometimes referred to as a "blade"). In other implementations, one or more of the processing chips is on a different PCBA but still in close physical proximity to the remaining processing chips in the memory and cache coherent system so as to allow for the extremely fast chip-to-chip volatile memory access (a characteristic critical to operation of CPU coherent systems). For example, the processing chips may be on different PCBAs integrated within a same server or within two or more servers in close physical proximity in same data storage center.

The memory 108, 110, 112, and 114 hosted by each processing chip may understood as including at least volatile memory and in many implementations, volatile and non-volatile memory. In one implementation, each of the processing chips (IC_1, IC_2, IC_3, and IC_4) hosts a different subset of system memory collectively mapped to a same logical address space. For example, the non-volatile memory space hosted by the various processing chips may be mapped to a range of logical addresses used by a host when reading and writing data to the CPU coherent system 100. In one implementation, each logical address of a host addressing scheme is mapped to only a single non-volatile memory location in the system (e.g., a location hosted by a single one of the four processing chips). If, for example, the host's logical address range is represented by an alphanumeric sequence A-Z, each different processing chip may host a different subset of that sequence (e.g., IC_1 may host A-G while IC_2 hosts H-N, IC_3 hosts O-T, and IC_4 hosts U-Z). In addition, the memory of each of the processing chips may include volatile memory and one or more local caches where data may be, at times, updated locally without immediately updating the corresponding non-volatile memory location.

The coherent mesh fabric 130 of the system provides the physical and logical infrastructure that allows each of the four processing chips to collectively operate as a cache, memory, and I/O coherent system by (1) providing direct data links between each processing chip and each memory resource in the system (2) by providing a coherency scheme that allows memory and resources hosted by any one of the processing chips to be accessed and used (e.g., read from and written to) by any processor anywhere on the map of the coherent mesh fabric 130.

In physical terms, the coherent mesh fabric 130 may be understood as including a silicon-level data bus (e.g., a physical interconnect 132) that provides a direct path between each processing chip and every other processing chip in the CPU coherent system. Additionally, the coherent mesh fabric 130 includes routing logic and routing control electronics for executing such logic. The routing logic and the routing control electronics are collectively represented in FIG. 1 by a routing engine 122. Although the routing engine 122 is shown to be centralized (for simplicity of concept), it should be understood that the logic and hardware resources employed by the routing engine may actually be distributed among the various processing chips, as shown with respect to FIGS. 2A and 2B.

The physical interconnect 132 may assume a variety of different forms in different implementations. In one implementation, the physical interconnect 132 is a peripheral component interconnect express (PCIe) physical interface that provides physical data links between each different pair of processing chips in the system. For example, the coherent mesh fabric 130 may be a memory interconnect that uses a PCIe interface standard or other interface standard (e.g., serial ATA (SATA), USB, serial attached SCSI (SAS), Fire-Wire, accelerated graphics port (AGP), peripheral component interconnect (PCI)) to facilitate fast and direct communications between each pair of processing chips in the CPU coherent system 100.

The routing engine 122 implements a coherency scheme via the coherent mesh fabric 130 that allows each processing entity coupled to the coherent mesh fabric 130 to have knowledge of the most recent version of all system data. Although the exact coherency scheme utilized may vary from one implementation to another, the routing engine 122 implements this scheme, at least in part, by managing and dynamically updating one or more system routing tables. By example and without limitation, expanded view 136 of routing engine 126 illustrates an example routing table 134 at two different points in time t1 and t2 to exemplify a dynamic update to isolate a portion of the system, discussed in greater detail below.

The routing table 134 provides a mapping between logical addresses of the system and physical "endpoints," where each physical endpoint identifies a select one of the different processing chips that stores the most current version of the data corresponding to that logical address. In one implementation, the routing engine 122 manages routing tables with respect to each one of the processing chips. In this case, the routing table 134 for each different processing chip may only the logical addresses that are not hosted by that chip. For example, the routing table for the processing chip "IC_3" may list the logical addresses corresponding to data storage locations hosted by IC_1, IC2, and IC_4. In still other implementations, the routing table of each processing chip provides a complete mapping between every logical address in the memory space of the system and each corresponding endpoint (e.g., processing chip hosting memory storing the associated data).

When any one of the processing chips in the system receives a host request to read or write data, the routing engine of that processing chip determines an endpoint location for storage of that data. If, for example, IC_3 receives a request to read data at logical address "ABC," the routing engine 122 consults the appropriate routing table (e.g., the routing table 134) and determines that a most recent version of this data is stored within memory hosted by IC_4. In this example, the data of logical address "ABC" may be stored on non-volatile memory hosted by IC_4, or instead, within volatile memory on IC_4, such as in a local cache hosted by IC_4. The routing engine 122 directs a read control signal to IC_4 along the appropriate data link of the physical interconnect 132 and employs logic stored locally on the receiving chip to further direct the read control signal to the appropriate physical storage location, whether that be in volatile memory (e.g., a cache) or non-volatile memory.

One consequence of the coherency scheme implemented in the CPU coherent system 100 is that a hardware failure occurring anywhere within the system has the potential to crash the entire CPU coherent system 100. If, for example, a DRAM component fails in memory 110 of the chip IC_2, the processing components on each processing chip may freeze (e.g., hang indefinitely) responsive to receipt and attempted processing of the next read or write command targeting the failed DRAM component. This can cause a system-wide failure in the sense that all four processing chips may freeze, one at a time, until the entire CPU coherent system 100 is hung and in need of reboot.

Although there are scenarios where a memory failure (e.g., DRAM) may be addressed upon reboot by merely re-mapping the data previously loaded into the failed DRAM to spare volatile memory, there exist scenarios when it is not possible to merely re-map logical memory space to exclude a particular physical memory component due to, for example, memory constraints (e.g., lack of sufficient spare memory and/or non-swappable nature of memory hardware component) or other reasons. For example, some systems require memory mappings to DRAM dual in-line memory modules (DIMMs) upon boot while other systems require memory mappings to multiple surface-mounted memory channels (e.g., DRAMs soldered to the board) and/or mappings to high bandwidth memory (HBM memory) that is formed integrally as part of the processing chip. When these types of components fail, memory re-mapping may not be a feasible option.

In still other scenarios, hardware failures affect non-memory chip components including parts of silicon chip and bus. For example, a solder joints mail fail or a fan failure may cause heat damage to a processor. In these scenarios, proper isolation of the subsystem hosting the failed component (as described below) may allow the system to continue to function nominally.

In FIG. 1, the CPU coherent system 100 includes a board management controller 138 that continuously monitors system event data and health indicators, recording information potentially relevant to hardware component defects and failures in an error log 140. For example, the board management controller 138 may try polling each of the processing chips periodically (e.g., every 10 ms) and immediately record a timestamped event when any one of the processing chips becomes unresponsive.

When a partial or system-wide failure occurs due to a failed or failing hardware component, the board management controller 138 may reboot the entire system and, upon reboot, analyze the error log 140 to determine a most likely location of the defective (e.g., failed, failing, or malfunctioning) component that caused the system-wide failure. In the example where the defective hardware component is a DRAM in memory 110 of IC_2, the board management controller 138 analyzes the error log 140 to determine that IC_2 is the endpoint associated with the failed component.

The error log 140 may serve as a basis for generating notifications that inform a system administrator that a particular chip or server needs to be repaired or replaced. In systems lacking the coherent mesh fabric 130, the entire CPU coherent system may remain offline (non-functional) following the detection of a defective component until such time that the system administrator is actually able to perform the requisite maintenance to repair or replace the defective component. However, in the presently-disclosed system, the coherent mesh fabric 130 includes logic for selectively isolating the endpoint (e.g., the processing chip) that is host to the failed or failing hardware component. This host endpoint of the defective hardware component is referred to below as the "failed endpoint."

In one implementation, isolation of the failed endpoint is achieved by selectively updating all system routing tables (e.g., the routing table 134) to remove all access routes directed to physical locations hosted by the failed endpoint. If, for example, a DRAM component fails in memory 110 of IC_2, the board management controller 138 may, upon reboot, analyze the error log 140 to identify IC_2 as the failed endpoint. The board management controller 138 may then instruct the coherent mesh fabric 130 to update the routing tables of each of the other processing chips (e.g., IC_1, IC_2, and IC_4) to remove all access routes with endpoints corresponding to the failed endpoint.

In the rudimentary example of FIG. 1A, this update to routing tables in the system is exemplified by the illustrated change between times t1 and t2 with respect to the routing table 134. At time t1, the routing table 134 includes all logical addresses hosted by any of processing chip endpoints. Between time t1 and t2 the routing engine 126 has received and executed an instruction from the board management controller 138 that results in the removal of all addresses associated with the failed endpoint. This may, for example, render each of the remaining processing chips in the system (e.g., IC_1, IC_3, and IC_4) unable to service addresses having access routes mapped to the failed endpoint. The removal of all of the access routes to the failed endpoint allows the remaining endpoints to continue to operate nominally and service requests that do not directly depend on the failed endpoint. Stated differently, the failed endpoint is taken offline and the remaining endpoints do not hang indefinitely because they no longer have the capability to process requests to the failed endpoint.

Figure 1B:
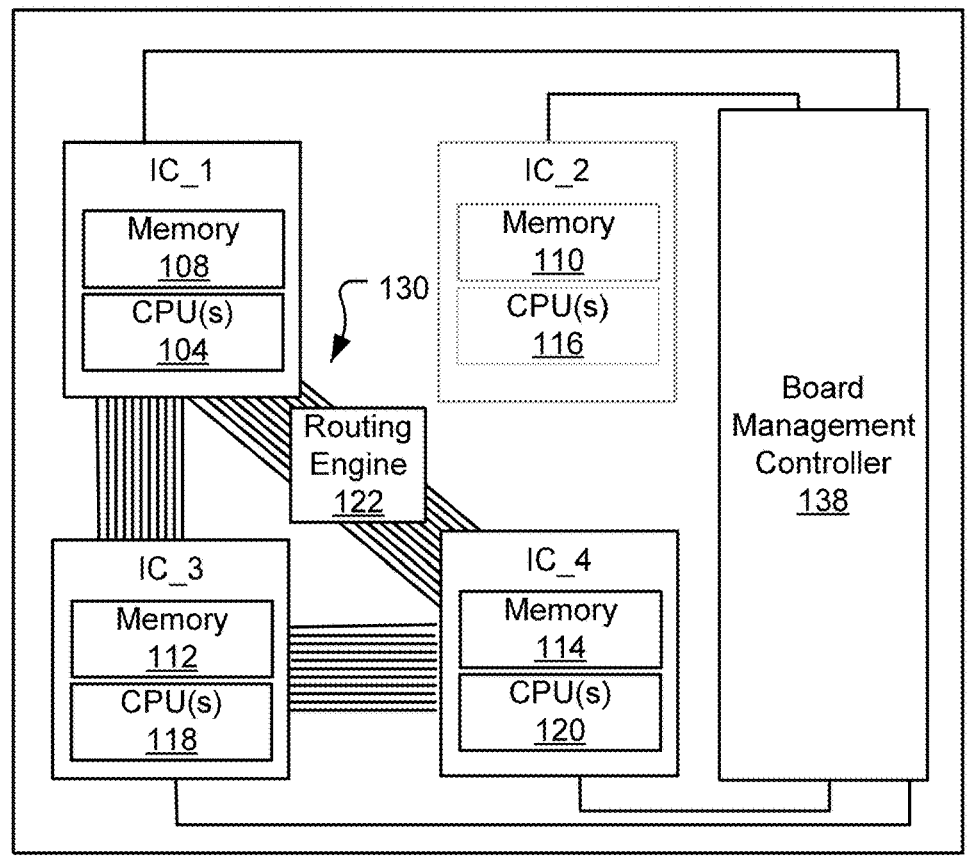
FIG. 1B illustrates an effect of updating one or more routing tables in the CPU coherent system of FIG. 1A to selectively isolate a region of the system.

FIG. 1B illustrates a practical effect of isolating a failed endpoint (e.g., IC_2) in the CPU coherent system 100 by updating one or more routing tables, as described above. Although the physical structure of the coherent mesh fabric 130 is unchanged, the failed endpoint is logically isolated such that the other endpoints in the system (e.g., IC_1, IC_3, and IC_4) are no longer able to "see" the failed endpoint. All routing tables in the system have been updated to redact the reference to logical addresses hosted by the failed endpoint. For a period while these redacted logical addresses are absent from the system's routing tables, the remaining endpoints remain active and execute nominally, despite the fact that the system may not immediately (or for a period or hours, days, or more), reload the data associated with redacted addresses. For example, the CPU coherent system 100 may not immediately (or ever) replace the redacted routes with new routes to alternate physical locations storing the data associated with the redacted addresses.

Notably, the system mapping of logical address to physical memory space may remain unchanged by the above-described update to the physical routing tables. That is, the actual logical-to-physical block mapping maintained on the various processing chips remains unaltered despite the updates to the routing tables (e.g., the tables providing inter-chip memory access) to remove the subset of routes mapped to the failed endpoint.

In the event that any of the remaining active endpoints receive a read or write request to an address previously-associated with the failed endpoint (e.g., IC_2), the routing engine processing the read/write request may return an "address not found" indicator. In some implementations, the system may, at such time, initiate contingency protocols for locating the data previously stored at the failed endpoint. For example, the system may use the address itself or other information in the read/write command to locate a back-up copy of data associated with the address and, in some scenarios, load the data from a back-up location into an available location with the memory 108, 112, or 114. However, all system endpoints other than the failed endpoint continue to execute nominally during a period of time after the failed endpoint is isolated and before the data associated with the failed endpoint is restored elsewhere on the system from redundant (back-up) storage locations.

Figure 2A:
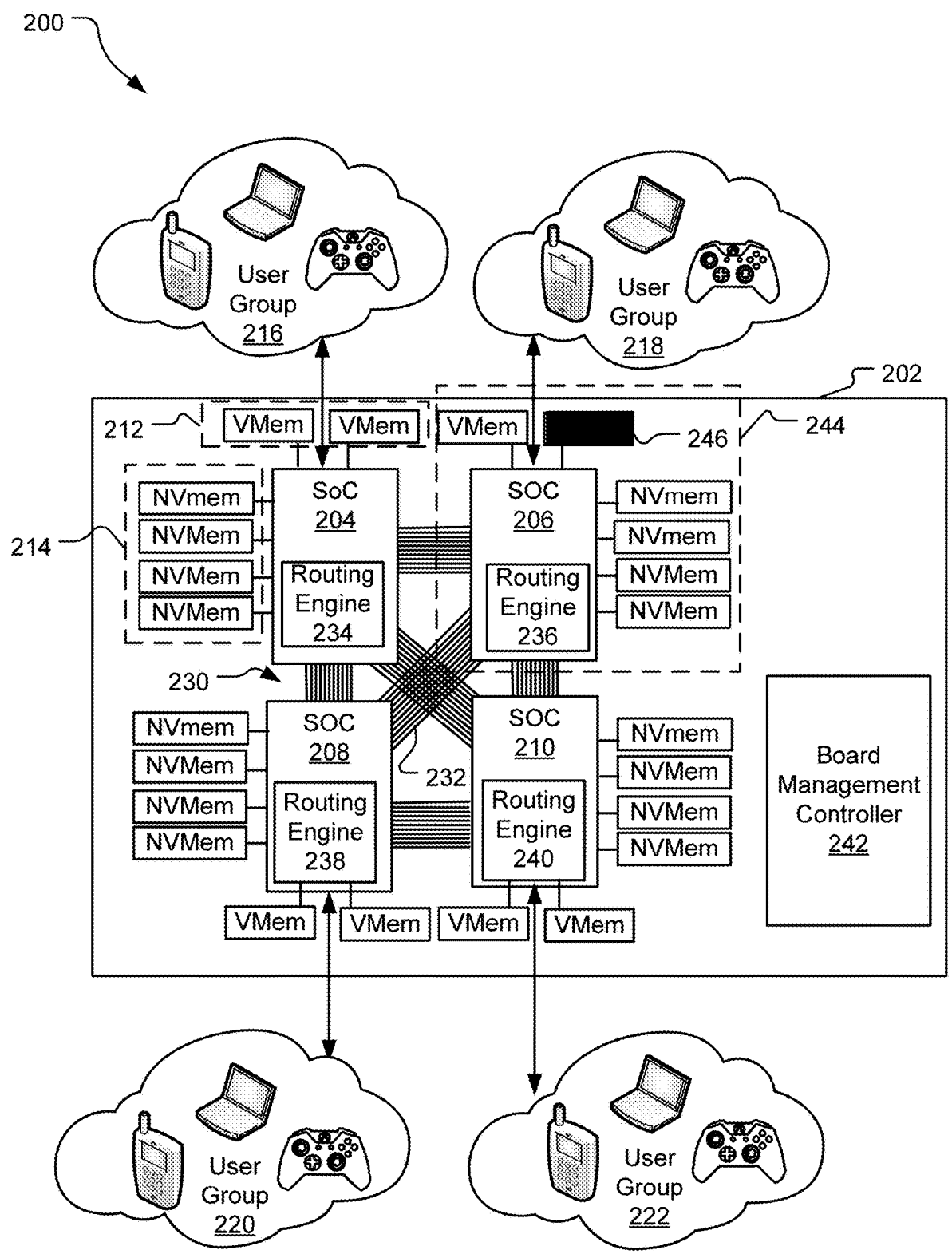
FIG. 2A illustrates another example coherent CPU system that implements self-healing logic to selectively isolate a region of the system following the detection of a defective hardware component.

FIG. 2A illustrates another example CPU coherent system 200 that implements self-healing logic to selectively isolate a region of the system following the detection of a defective hardware component. The CPU coherent system 200 includes a server blade 202 that includes multiple SoCs 204, 206, 208, and 210. Each of the SoCs 204, 206, 208, and 210 hosts memory including both volatile memory (e.g., VMem 212), such as RAM or DRAM, and non-volatile memory (e.g., a non-volatile storage bank 214), such as one or more hard drive assemblies (HDAs), solid state drives (SSDs), etc. In addition, each of the SoCs may include a number of individual processors (CPUs and GPUs) that are cache and memory coherent with one another as well as all other processing entities in the server blade 202, coupled to one another by a coherent mesh fabric 230 that includes both physical links between each pair of SoCs in the system and their associated resources as well as coherency logic and hardware for executing such logic (e.g., routing engines 222, 224, 226, and 228) for routing requests to different endpoints in the system.

Although the examples of both FIGS. 1A-1B and 2A include four processing chips in the exemplary CPU coherent systems 100 and 200, it should be understood that the herein disclosed technology may be applicable in memory and cache coherent systems with any number of interconnected chips—either on the same PCBA or different PCBAs in close physical proximity (e.g., the same shelf or rack in a data center).

By example and without limitation, the server blade 202 is shown to be a game server. Each of the different SoCs 204, 206, 208, and 210 acts as a host to an associated group of online game players (e.g., user groups 216, 218, 220, or 222, respectively). The server blade 202, in this example, stores a number of games at non-redundant locations in the various non-volatile memory storage media. For example, the SoC 204 may store games such as Minecraft®, Candy Crush®, and Words With Friends®, while SoC 206 stores other games such as Fortnite®, Call of Duty®, and Grand Theft Auto®, etc. Each of these games may be stored in a single non-volatile memory location within the system. Due to the memory and cache coherent architecture of the CPU coherent system 200, each of the SoCs 204, 206, 208, and 210 may be able to load any game stored in the system's non-volatile memory to local volatile memory allowing all of the different user groups 216, 218, 220, and 222 to play the game regardless of which non-volatile drive permanently stores the game. For example, Minecraft® may be actually stored in an SSD of the non-volatile storage bank 214 but loaded into the volatile memory (e.g., DRAM) hosted by SoC 210 whenever one of the users in user group 222 requests to load a new instance of the game.

The coherent mesh fabric 230 includes a data bus consisting of a physical interconnect 232 that is, in one implementation, a PCIe physical interface that provides data links between the various SoCs and also between each SoC and each data-storing resource in the system. For example, the physical interconnect 232 gives the SoC 204 direct access to memory hosted by SoC 206, SoC 208, and SoC 210 such that the SoC 204 can read or update data at any system memory location without having to ask a processor at the associated endpoint to take any action.

In addition to the physical interconnect 232, the coherent mesh fabric 230 includes routing logic and processing hardware represented in FIG. 2A as routing engines 234, 236, 238, and 240. In one implementation, the coherent mesh fabric 304 is a memory interconnect with control electronics that use a PCIe interface standard to facilitate fast and direct communications between each pair of processing chips in the CPU coherent system 300.

The server blade 202 includes a board management controller 242 that monitors health and performance of various components in the system and creates a logfile (not shown) logging actions indicative of potential hardware malfunctions. For example, the board management controller 242 may log information on an on-going basis related to functionality of the bus (e.g., the physical interconnect 232 and routing engines 234, 236, 238, and 240), all system memory components, and all system processing components (e.g., each system CPU, GPU). Upon detection of any potential hardware component malfunction at a given endpoint (e.g., a "failed endpoint 244" including SoC 206 and all memory and hardware hosted by SoC 206), the board management controller 242 updates the logfile to indicate the physical location of the potentially defective hardware component.

In the illustrated example, a volatile memory component 246 hosted by SoC 206 experiences a sudden failure. This failure could affect the system in different ways depending upon what the failed drive is being used for in the system. If, for example, the volatile memory component 246 stores an active copy of the game Minecraft®, the other system endpoints (e.g., SoC 204, SoC 208, and Soc 210) may experience a hang-up (system freeze) at the next attempt to access this game.

In one implementation, the board management controller 242 initiates a reboot of the server blade 202 responsive to detection of the potential hardware failure. Upon reboot, the board management controller 242 analyzes log data and, based on this analysis, determines that the failed component is hosted by SoC 206. Responsive to identification of the endpoint hosting the failed component, the board management controller 242 instructs the coherent mesh fabric 230 (e.g., the routing engines 234, 236, 238, and 240) to update their respective routing tables to remove all access routes with endpoints corresponding to the SoC hosting the failed component.

In another implementation, the analysis of the logfile and dynamic rerouting is performed without taking the entire system offline. For example, the board management controller 242 may immediately detect the failed volatile memory component 246 when its host SoC (206) experiences a detectable error as a result of the hardware failure. At this point in time, the board management controller may dynamically (e.g., without reboot of the CPU coherent system 200) instruct the coherent mesh fabric 230 to update all system routing tables to remove the access routes with endpoints corresponding to the failed endpoint 244.

Figure 2B:
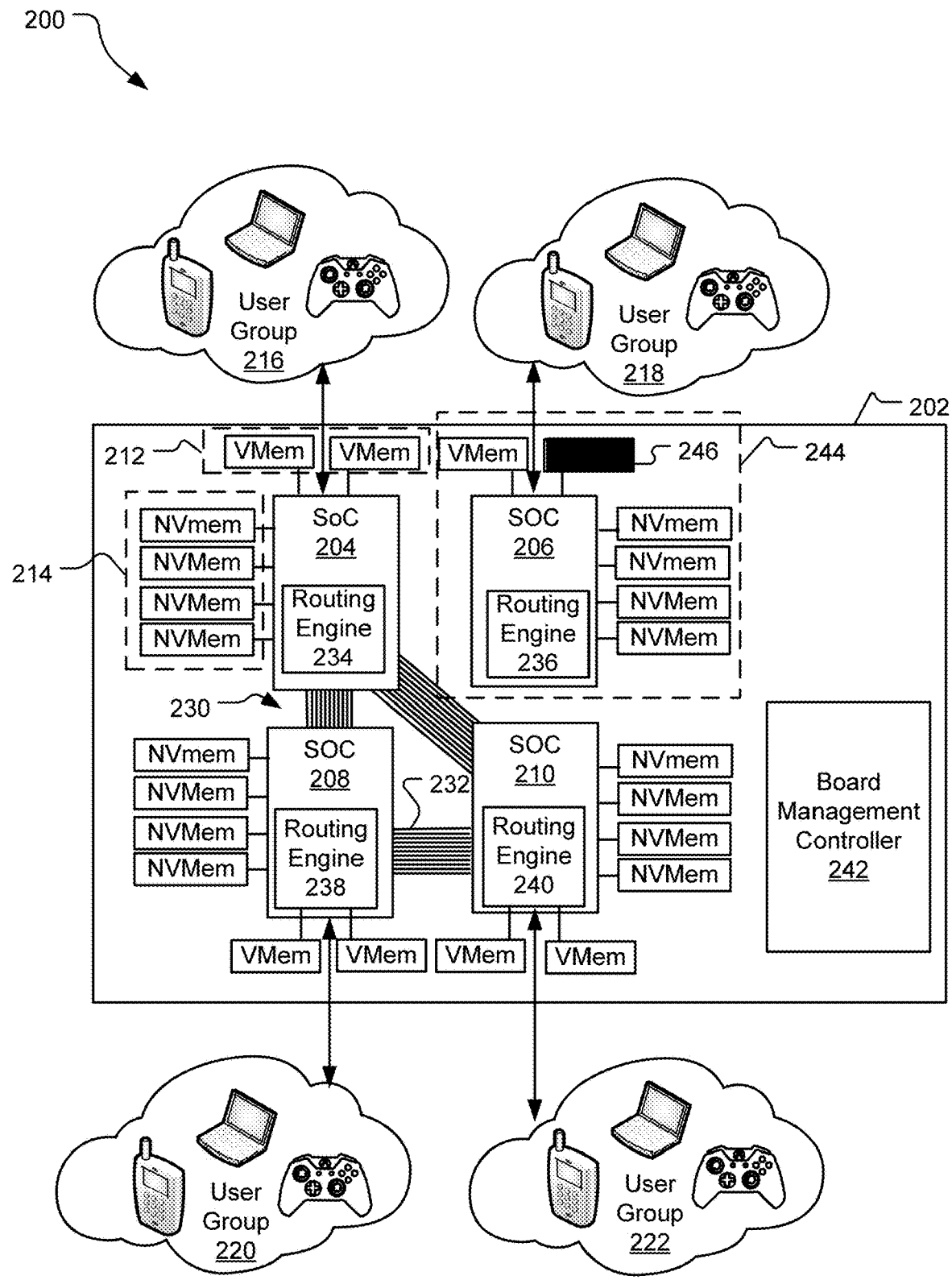
FIG. 2B illustrates an effect of updating one or more routing tables in the CPU coherent system of FIG. 1A to selectively isolate a region of the system.

FIG. 2B illustrates a practical effect of updating one or more routing tables in the CPU coherent system of FIG. 1A to selectively isolate one of the SoCs hosting a defective hardware component. In the illustrated example, routing engines 234, 238, and 240 have redacted from their respective routing tables all routes having endpoints mapped to physical storage locations hosted by the failed endpoint 244. In one implementation, these access routes are completely erased from the routing tables without implementing alternate routes to the data hosted by the failed memory component 246 at the time of the hardware failure. Due to this route erasure, the coherent mesh fabric 232 is no longer able to determine where a newest version of this data is stored. Since the routing tables of the coherent mesh fabric 232 no longer include routes mapped to the failed endpoint 244, the remaining active processing entities hosted by SoC 204, SoC 208, and SoC 210 no longer have any way of directing read or write requests to the logical addresses routed, by the routing tables, to the failed endpoint 244 at the time of the hardware failure. This allows the remaining SoCs 204, 208, and 210 to continue to operate in a limited or near-nominal capacity until such time that the failed volatile memory component 246 can be replaced.

Notably, the isolation of the failed endpoint 244 may render a significant portion of system data temporarily unavailable to users connected to the other system endpoints. In some implementations, the server blade 202 is configured to self-initiate contingency operations for re-loading data previously-hosted by the failed endpoint 244, as needed, to alternate system storage locations. For example, the next time that the SoC 204 receives a request to join a new instance of the game Minecraft®, the SoC 204 may determine that the game cannot be found on the server blade 202 and begin to search other network locations for a back-up copy of the data. When a redundant copy of the game is located (e.g., on other server, a backup database, etc.), the game is then loaded into non-volatile memory of one of the still-active endpoints where it can be accessed by all of the remaining active SoCs.

When the drive 246 initially fails, this sudden failure may have the effect of interrupting the connections of all users in user group 218 connected to the SoC 206. For instance, a user in the user group 218 may be temporarily disconnected from the server blade 202 and upon attempting to re-establish the connection, be added to one of the user groups 216, 220, and 222 hosted by a different one of the system endpoints. Alternatively, the user may, upon reconnection, be connected to the gaming system through a different an entirely different server blade that provides the same gaming services.

It should be understood that gaming services are intended to represent only one of many different potential use cases for the herein disclosed technology. Similar applications may, for example, be realized with respect to cloud-computing service providers that provide data storage and compute resources to cloud service providers. For example, thousands to millions of server blades similar to the server blade 202 may exist in a data server center to support non-gaming workloads. In such a system, each server may include multiple processor cores distributed across different chips sharing memory and cache resources with one another. The ability to isolate an endpoint hosting a defective component permits the processing cores on the other endpoints to remain active and to continue executing nominal workloads until such time that the defective component can be served or replaced.

Likewise, the above-described isolation techniques may also be useful in systems that couple together multiple SoCs to create a virtual machine. For example, there exist scenarios where multiple SoCs are configured to pool together resources to increase the processing and compute power otherwise available to end user(s). In one implementation, a virtual machine is created by pooling together GPU processing power on two different SoCs, turning an 80 core GPU into, effectively, a 160 core GPU. If one of the two SoCs of the virtual machine experiences a hardware failure, the other SoC may continue to try to use the resources on the failed chip. In this example, the coherent mesh fabric 230 may reconfigure the routing table to remove access routes with logical addresses mapped to the failed chip, reducing the virtual machine's effective compute power from 160 core back down to 80 core but still allowing the active 80 core to perform nominal compute operations.

Figure 3:
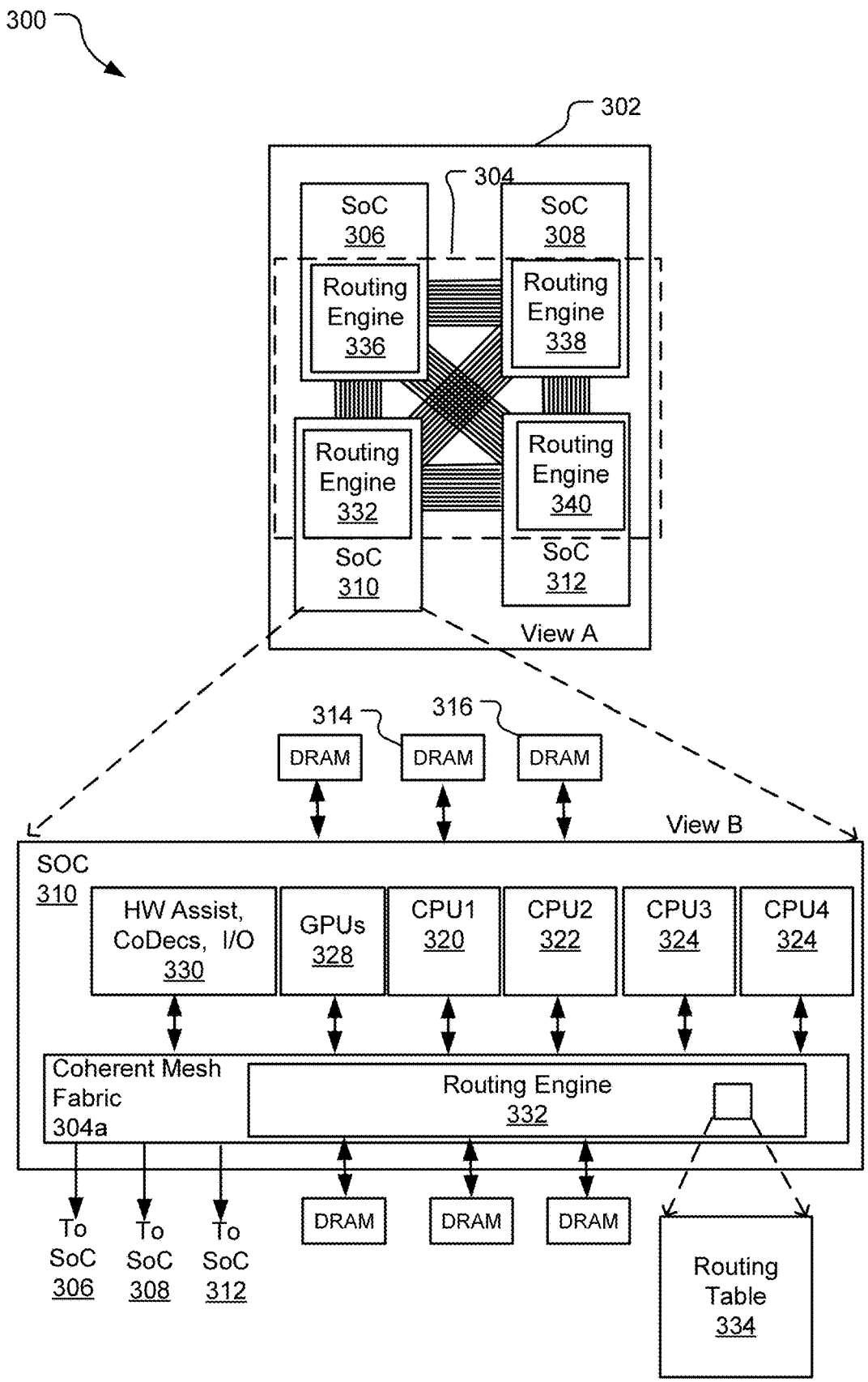
FIG. 3 illustrates an exemplary architecture of a coherent CPU system that implements self-healing logic to selectively isolate a system endpoint following detection of a hardware component failure.

FIG. 3 illustrates an exemplary architecture of a CPU coherent system 300 that implements self-healing logic to selectively isolate a system endpoint following detection of a hardware component failure. View A illustrates a server blade 302 with four different SoCs 306, 308, 310, and 312 interconnected by a coherent mesh fabric 304. View B illustrates an expanded view of the SOC 310. It may be understood that the other SoCs 306, 310, and 312 have the same or similar architectures.

The SoC 308 is, in view B, shown to include four CPUs 320, 322, 324, and 326 that each have 8 processing cores. In one example implementation, multiple of these four different CPUs are configured to pool resources to provide an end user with a virtual machine experience. In addition to the multiple different CPUs, the SoC 310 includes a graphics processing unit, GPU 328, as well as hardware and software (e.g., various drivers) as well as encoders, decoders, I/O components, and buses, represented by functional box 330.

SoC 310 additionally includes a number of connections for optional coupling to DRAMs (e.g., DRAM 314, 316). Additionally, the SOC 310 includes some of the hardware and executable logic represented by the coherent mesh fabric 304 in View A. Since the coherent mesh fabric 304 does not, in its entirety, reside physically on the SoC 310, View B refers to a coherent mesh fabric 304a, which is to be understood as referring to a subset of the coherent mesh fabric 304. The coherent mesh fabric 304a includes physical data links to memory and processing resources on each of the other SoCs (e.g., the SoCs 306, 308, and 312). Additionally, the coherent mesh fabric 304a includes a routing engine 332 that locally manages a routing table 334 according to a system-wide coherency scheme. The routing engine 332 dynamically updates access routes in the route table 334 such that the route table 334 maps each logical address in the system to a physical endpoint (e.g., SoC 306, 308, 310 or 312) where the most current version of the associated data is stored, regardless of whether that data resides in volatile or non-volatile memory. Aspects of the routing table 334 not explicitly described herein may be the same or similar to those described above with respect to the routing table 134 of FIG. 1.

In one implementation, the coherent mesh fabric 304 is a 1.2 to 1.8 GHz communication bus that uses PCIe interface links to provide the connects between the resources of each pair of endpoints in the CPU coherent system 300. For example, the coherent mesh fabric 304 may be a bus that incorporates controllers at each endpoints to manage the flow of data across the physical links of the bus. In other implementations, the coherent mesh fabric 304 may assume other physical forms including, for example, any silicon bus that uses a PCIe or other interface standard to provide direct communications between system endpoints.

Figure 4:
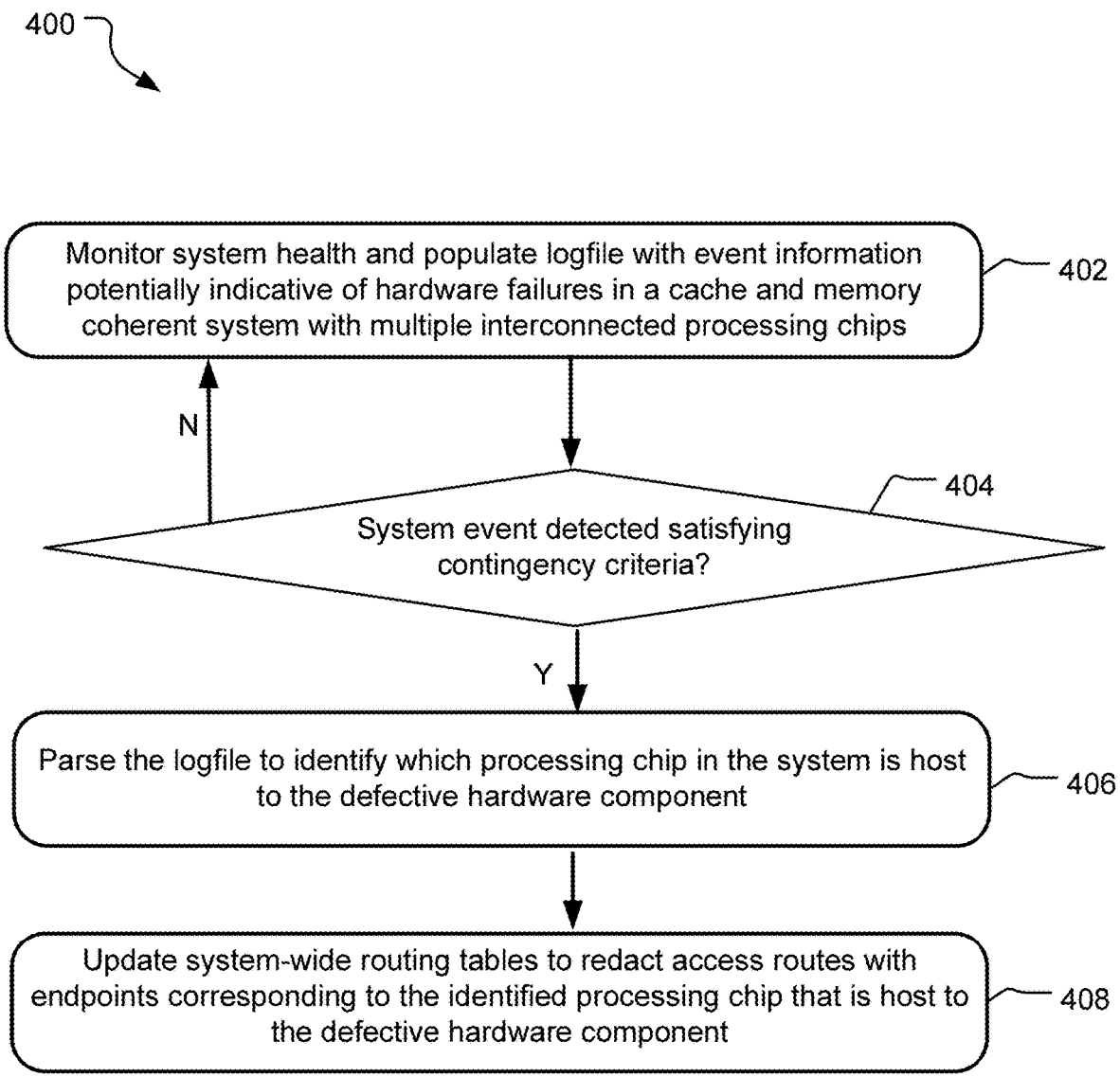
FIG. 4 illustrates example operations for implementing self-healing logic within a cache and memory coherent multi-chip system.

FIG. 4 illustrates example operations 400 for implementing self-healing logic within a cache and memory coherent multi-chip system. According to one implementation, the cache and memory coherent system includes multiple processing chips that each host a different subset of a shared memory space. A monitoring operation 402 monitors the health of various components in the cache and memory coherent system and populates a logfile with event information potentially indicative of hardware failures. For example, the monitoring operation 402 may include sending test signals to a number of different processing components and logging timestamped response information. A determination operation 404 determines when and if a system event occurs satisfying predefined contingency criteria. The predefined contingency criteria may be satisfied when, for example, then system event is a non-responsive CPU or other events indicative of a CPU crash, system hang-up, etc.

Until such time that a detected system event satisfies the contingency criteria, the monitoring operation 402 continues to monitor the system and populate the logfile. When the determination operation 404 does, in fact, determine that a detected event satisfies the contingency criteria, a parsing operation 406 parses the logfile to identify a defective hardware component that caused the system event. In some implementations, the system may be rebooted and the logfile parsed responsive to the reboot. The parsing operation 406 identifies a select processing chip of the multiple processing chips in the system that is host to the defective hardware component that caused the system event.

Responsive to identification of the select processing chip that is host to the defective hardware component, a routing table update operation 408 updates routing tables throughout the cache and memory coherent system to redact (e.g., delete) all access routes defined by such tables that have endpoints corresponding to the select processing chip hosting the defective hardware component. For example, a subset of the system's logical block address space may be temporarily erased from the system in the sense that those logical addresses cease to correspond to any defined physical storage location. The redaction of these logical addresses from the system routing tables allows the remaining processing chips (e.g., excluding the select chip) to continue to function nominally while the select processing chip remains isolated (e.g., invisible to the other processing chips for system route operations).

Figure 5:
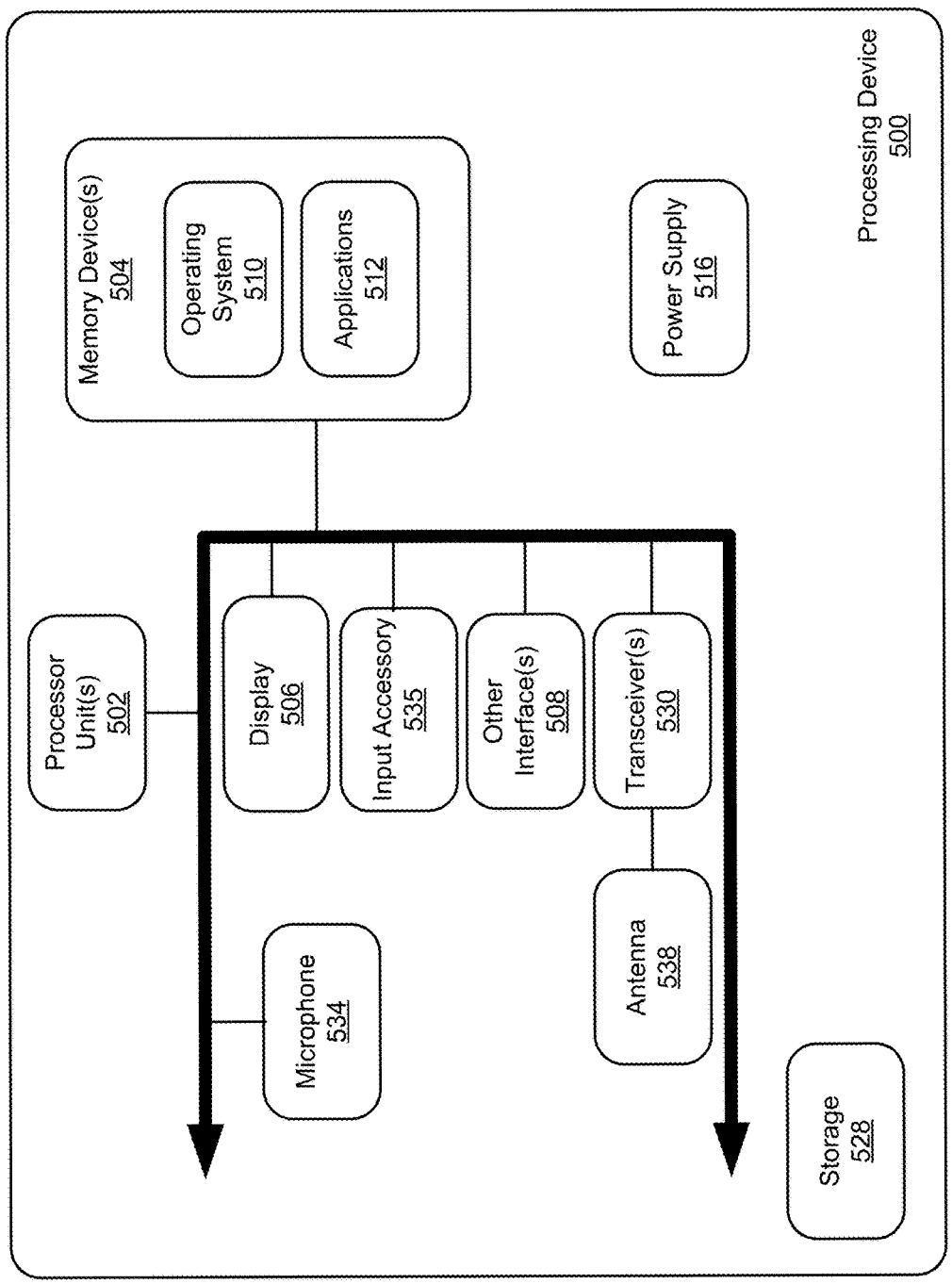
FIG. 5 illustrates an example schematic of a processing device suitable for implementing aspects of the disclosed technology.

FIG. 5 illustrates an example schematic of a processing device 500 suitable for implementing aspects of the disclosed technology. The processing device 500 may, for example, represent a user device that interfaces with a cache and memory coherent system or, instead, a device that includes multiple processing chips that operate as a cache and memory coherent system. The processing devices includes one or more processor unit(s) 502, memory device(s) 504, a display 506, and other interfaces 608 (e.g., buttons). The processor unit(s) 502 may each include one or more CPUs, GPUs, etc.

The memory 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, may resides in the memory 504 and be executed by the processor unit(s) 502, although it should be understood that other operating systems may be employed.

One or more applications 512 are loaded in the memory 604 and executed on the operating system 610 by the processor unit(s) 602. Applications 512 may receive input from various input local devices such as a microphone 534, input accessory 535 (e.g., keypad, mouse, stylus, touchpad, gamepad, racing wheel, joystick), and a camera 532 (e.g., to provide the multiple object tracker with footage of a scene). Additionally, the applications 512 may receive input from one or more remote devices, such as remotely-located smart devices, by communicating with such devices over a wired or wireless network using more communication transceivers 530 and an antenna 538 to provide network connectivity (e.g., a mobile phone network, Wi-Fi®, Bluetooth®). The processing device 500 may also include one or more storage devices 528 (e.g., non-volatile storage). Other configurations may also be employed.

In the event that the processing device 500 operates a multi-chip cache and memory coherent system, the processors 502 may be distributed among different chips (e.g., SoCs) that are interconnected by a coherent mesh fabric (not shown) that includes elements consistent with those described herein with respect to any of FIG. 1A-1B, 2A-2B, or 3-4.

The processing device 500 further includes a power supply 516, which is powered by one or more batteries or other power sources and which provides power to other components of the processing device 500. The power supply 516 may also be connected to an external power source (not shown) that overrides or recharges the built-in batteries or other power sources.

The processing device 500 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language An example cache and memory coherent system disclosed herein includes multiple processing chips each hosting a different subset of a shared memory space and one or more routing tables defining access routes between logical addresses of the shared memory space and endpoints that each correspond to a select one of the multiple processing chips. The system further includes a coherent mesh fabric that physically couples together each of the multiple processing chips. The coherent mesh fabric is configured to execute routing logic for updating the one or more routing tables responsive to detection of a defective hardware component and identification of a first processing chip hosting the defective hardware component. The update to the one or more routing tables is effective to remove all access routes having endpoints corresponding to the first processing chip.

In an example cache and memory coherent system according to any preceding system, the coherent mesh fabric includes a communication bus that uses a peripheral component interconnect express (PCIe) physical interface. In another example cache and memory coherent system according to any preceding system, the processing chips are system-on-chips (SoCs) arranged on a same printed circuit board assembly (PCBA).

In yet still another cache and memory coherent system of any preceding system, the system includes a controller stored in memory and configured analyze system log information to identify the first processing chip hosting the defective hardware component.

In another example cache and memory coherent system according to any preceding system, the cache and memory coherent system is further configured to pool together resources on two or more of the processing chips to provide a user with a virtual machine experience.

In still another example cache and memory coherent system according to any preceding system, the coherent mesh fabric executes the routing logic for updating the one or more routing tables responsive to a reboot of the cache and memory coherent system.

An example method disclosed herein includes analyzing system log information to identify a location of a defective hardware component within a cache and memory coherent system that includes multiple processing chips each hosting a different subset of a shared memory space. The method further provides for updating one or more of routing tables to remove all access routes mapping logical addresses of the shared memory space to endpoints corresponding to the first processing chip corresponding to the location of the defective hardware component.

In yet another example method of any preceding method, updating the one or more routing tables includes removing the access routes having the endpoints corresponding to the first processing chip without adding new access routes to the logical addresses identified by the removed access routes.

In still another example method of any preceding method, the multiple processing chips are coupled together via a coherent mesh fabric including a communication bus that uses a peripheral component interconnect express (PCIe) physical interface.

In yet still another example method of any preceding method, the processing chips are system-on-chips (SoCs) arranged on a same printed circuit board assembly (PCBA).

In yet still another example method of any preceding method, the method further comprises generating a logfile including system log information indicative of potentially defective hardware components hosted by any of the multiple processing chips.

In yet still another example method of any preceding method, updating the one or more routing tables comprises updating a routing table stored on each of a plurality of different processing chips of the multiple processing chips.

In still yet another example method of any preceding method, the coherent mesh fabric executes logic for updating the one or more routing tables responsive to a reboot of the cache and memory coherent system.

An example tangible computer-readable storage media disclosed herein encodes computer-executable instructions for executing a computer process comprising: analyzing system log information to identify a location of a defective hardware component in a cache and memory coherent system including multiple processing chips each hosting a different subset of a shared memory space. The method further provides for updating one or more routing tables to remove all access routes mapping logical addresses of the shared memory space to endpoints corresponding to a first processing chip of the multiple processing chips responsive to determining that the location of the defective hardware component corresponds to the first processing chip.

In another example tangible computer-readable storage media of any preceding storage media, the encoded computer process provides for updating the routing tables used to facilitate communications between multiple processing chips coupled together via a coherent mesh fabric. The coherent mesh fabric including a communication bus that uses a peripheral component interconnect express (PCIe) physical interface.

In yet still another example tangible computer-readable storage media of any preceding storage media, the routing logic facilitates communications between processing chips that are system-on-chips (SoCs) arranged on a same printed circuit board assembly (PCBA).

In yet still another example tangible computer-readable storage media of any preceding storage media, updating the one or more routing tables includes removing the access routes having the endpoints corresponding to the first processing chip without adding new access routes to the logical addresses identified by the removed access routes.

In still another example tangible computer-readable storage media of any preceding storage media, updating the one or more routing tables comprises updating a routing table stored on each of a plurality of different processing chips of the multiple processing chips.

In still another example tangible computer-readable storage media of any preceding storage media, the logic for updating the one or more routing tables is executed responsive to a reboot of the cache and memory coherent system.

An example system disclosed herein includes a means for analyzing system log information to identify a location of a defective hardware component within a cache and memory coherent system that includes multiple processing chips each hosting a different subset of a shared memory space. The system further includes a means for updating one or more of routing tables to remove all access routes mapping logical addresses of the shared memory space to endpoints corresponding to the first processing chip corresponding to the location of the defective hardware component.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A cache and memory coherent system comprising:
   multiple processing chips each hosting a different subset of a shared memory space, each hosted subset of the shared memory space corresponding to a range of logical addresses;
   one or more routing tables defining access routes between logical addresses of the shared memory space and endpoints that each correspond to a select subset of the shared memory space hosted by a corresponding one of the multiple processing chips; and
   a coherent mesh fabric that physically couples together each of the multiple processing chips, the coherent mesh fabric being configured to execute routing logic for updating the one or more routing tables responsive to detection of a defective hardware component and identification of a first processing chip of the multiple processing chips hosting the defective hardware component, the update to the one or more routing tables being effective to remove all access routes having endpoints corresponding to a first range of the logical addresses hosted by the first processing chip without implementing alternate access routes to data hosted by the defective hardware component.

2. The cache and memory coherent system of claim 1, wherein the coherent mesh fabric executes the routing logic to remove the access routes having the endpoints corresponding to the first processing chip without adding new access routes to the logical addresses identified by the removed access routes.

3. The cache and memory coherent system of claim 1, wherein the coherent mesh fabric includes a communication bus that uses a peripheral component interconnect express (PCIe) physical interface.

4. The cache and memory coherent system of claim 1, wherein the processing chips are system-on-chips (SoCs) arranged on a same printed circuit board assembly (PCBA).

5. The cache and memory coherent system of claim 1, further comprising a controller stored in memory and configured analyze system log information to identify the first processing chip hosting the defective hardware component of the multiple processing chips.

6. The cache and memory coherent system of claim 1, wherein the cache and memory coherent system is further configured to pool together resources on two or more of the processing chips to provide a user with a virtual machine experience.

7. The cache and memory coherent system of claim 1, wherein the coherent mesh fabric executes the routing logic for updating the one or more routing tables responsive to a reboot of the cache and memory coherent system.

8. The cache and memory coherent system of claim 1, wherein the different subsets of the shared memory space are mutually exclusive.

9. The cache and memory coherent system of claim 1, wherein the first range of logical addresses correspond to physical memory locations of the first select subset of the shared memory space hosted by the first processing chip.

10. A method comprising:
    analyzing system log information to identify a location of a defective hardware component within a cache and memory coherent system, the cache and memory coherent system including multiple processing chips each hosting a different subset of a shared memory space, each hosted subset of the shared memory space corresponding to a range of logical addresses; and
    responsive to determining that the location of the defective hardware component corresponds to a first processing chip of the multiple processing chips, updating one or more of routing tables defining access routes between logical addresses of the shared memory space and endpoints that each correspond to a select subset of the shared memory space hosted by a corresponding one of the multiple processing chips to remove all access routes mapping logical addresses of the shared memory space to endpoints corresponding to a first range of logical addresses hosted by the first processing chip without implementing alternate access routes to data hosted by the defective hardware component.

11. The method of claim 10, wherein updating the one or more routing tables includes removing the access routes having the endpoints corresponding to the first processing chip without adding new access routes to the logical addresses identified by the removed access routes.

12. The method of claim 10, wherein the multiple processing chips are coupled together via a coherent mesh fabric including a communication bus that uses a peripheral component interconnect express (PCIe) physical interface.

13. The method of claim 10, wherein the processing chips are system-on-chips (SoCs) arranged on a same printed circuit board assembly (PCBA).

14. The method of claim 10, further comprising:
    generating a logfile including the system log information, the system log information being indicative of potentially defective hardware components hosted by any of the multiple processing chips.

15. The method of claim 10, wherein updating the one or more routing tables comprises updating a routing table stored on each of a plurality of different processing chips of the multiple processing chips.

16. The method of claim 12, wherein the coherent mesh fabric executes logic for updating the one or more routing tables responsive to a reboot of the cache and memory coherent system.

17. One or more tangible computer-readable storage media encoding computer-executable instructions for executing a computer process comprising:
    analyzing system log information to identify a location of a defective hardware component within a cache and memory coherent system, the cache and memory coherent system including multiple processing chips each hosting a different subset of a shared memory space each hosted subset of the shared memory space corresponding to a range of logical addresses; and
    responsive to determining that the location of the defective hardware component corresponds to a first processing chip of the multiple processing chips, updating one or more of routing tables defining access routes between logical addresses of the shared memory space and endpoints that each correspond to a select subset of the shared memory space hosted by a corresponding one of the multiple processing chips to remove all access routes mapping logical addresses of the shared memory space to endpoints corresponding to a first range of logical addresses hosted by the first processing chip without implementing alternate access routes to data hosted by the defective hardware component.

18. The one or more tangible computer-readable storage media of claim 17, wherein the multiple processing chips are coupled together via a coherent mesh fabric including a communication bus that uses a peripheral component interconnect express (PCIe) physical interface.

19. The one or more tangible computer-readable storage media of claim 17, wherein the processing chips are system-on-chips (SoCs) arranged on a same printed circuit board assembly (PCBA).

20. The one or more tangible computer-readable storage media of claim 17, wherein updating the one or more routing tables includes removing the access routes having the endpoints corresponding to the first processing chip without adding new access routes to the logical addresses identified by the removed access routes.

21. The one or more tangible computer-readable storage media of claim 17, wherein updating the one or more routing tables comprises updating a routing table stored on each of a plurality of different processing chips of the multiple processing chips.

22. The one or more tangible computer-readable storage media of claim 17, updating the one or more routing tables is performed responsive to a reboot of the cache and memory coherent system.

* * * * *